(12) United States Patent
Aly Salama et al.

(10) Patent No.: US 10,212,058 B2
(45) Date of Patent: Feb. 19, 2019

(54) SYSTEM AND METHOD FOR DETECTING SYSTEM'S PERFORMANCE REGRESSION

(71) Applicant: International Business Machines Corporation, Armonk, NY (US)

(72) Inventors: Hitham Ahmed Assem Aly Salama, Dublin (IE); Shadi Ghaith, Amman (JO); Christian Benjamin Kau, Los Altos, CA (US); Patrick Joseph O'Sullivan, Ballsbridge (IE)

(73) Assignee: International Business Machines Corporation, Armonk, NY (US)

( * ) Notice: Subject to any disclaimer, the term of this patent is extended or adjusted under 35 U.S.C. 154(b) by 169 days.

(21) Appl. No.: 15/135,713

(22) Filed: Apr. 22, 2016

(65) Prior Publication Data

US 2017/0310566 A1    Oct. 26, 2017

(51) Int. Cl.
*H04L 12/26* (2006.01)
*H04L 12/24* (2006.01)

(52) U.S. Cl.
CPC .......... *H04L 43/045* (2013.01); *H04L 41/142* (2013.01); *H04L 43/0817* (2013.01); *H04L 43/16* (2013.01)

(58) Field of Classification Search
CPC ..... H04L 41/142; H04L 43/045; H04L 43/08; H04L 43/0817; H04L 43/16
See application file for complete search history.

(56) References Cited

U.S. PATENT DOCUMENTS

| 8,224,624 | B2 | 7/2012 | Cherkasova et al. |
| 2005/0120111 | A1* | 6/2005 | Bailey ................. G06F 11/3409 709/224 |
| 2009/0307347 | A1* | 12/2009 | Cherkasova ........ G06F 11/3419 709/224 |
| 2015/0254165 | A1 | 9/2015 | Baril et al. |
| 2017/0076202 | A1* | 3/2017 | George ................. H04L 41/142 |

* cited by examiner

*Primary Examiner* — Gil H. Lee
(74) *Attorney, Agent, or Firm* — DeLizio Law, PLLC

(57) ABSTRACT

Performance regression between a first version of an application and a second version of the application are detected using a comparison between transaction response times measured at a plurality of resource levels of a computer system. A first set of transaction response times (for the first version) are used to determine lower and upper limit line graphs. A new line graph determined from second set of transaction response times (for the second version) can be compared with the lower and upper limit line graphs to detect a performance regression.

20 Claims, 5 Drawing Sheets

SYSTEM AND METHOD FOR DETECTING SYSTEM'S PERFORMANCE REGRESSION

BACKGROUND

Embodiments of the inventive subject matter generally relate to the field of computers, and, more particularly, to detecting performance regression.

During the production of a software application, a vendor may conduct performance testing for a new version. For example, the performance testing can confirm that a new release (or milestone build) performs no worse than the previous version of the application. During a performance test, the vendor may expose the application to a load similar to the expected workload for an extended period of time. These performance tests may generate performance data that the vendor will compare with previous performance data for the previous version to identify performance regression. However, it is not always practical to test the application using consistent workload environments. Furthermore, an analytical approach to comparing performance testing data may provide faster results and/or more accurate detection of performance regression.

SUMMARY

Provided are techniques for detecting a performance regression using a comparison of performance measurements associated with different versions of an application.

In one embodiment, a method comprises measuring a first performance associated with a first version an application based on a first set of transaction response times for a first plurality of resource levels. A lower limit line graph and an upper limit line graph are determined based, at least in part, on the first set of transaction response times. A second performance associated with a second version of the application is measured, the second performance based on a second set of transaction response times for a second plurality of resource levels. A new line graph is determined based on the second set of transaction response times. An area of anomaly is determined. In one example, the area is between the new line graph and the lower limit line graph where the new line graph is less than the lower limit line graph. In another example, the area is between the new line graph and the upper limit line graph where the new line graph is greater than the upper limit line graph. A performance regression is indicated in response to the area of anomaly being greater than a threshold amount.

BRIEF DESCRIPTION OF THE DRAWINGS

The aspects of the disclosure may be better understood by those skilled in the art by referencing the accompanying drawings.

DESCRIPTION OF EMBODIMENT(S)

The description that follows includes example systems, methods, techniques, instruction sequences and computer program products that embody techniques of the present inventive subject matter. However, it is understood that the described embodiments may be practiced without these specific details. For instance, although aspects of the disclosure are described in the context of a performance regression, the techniques may be used to detect other application performance anomalies. In other instances, well-known instruction instances, protocols, structures and techniques have not been shown in detail in order not to obfuscate the description.

When a new version of an application is released, ideally the new version will perform at least as well as the previous version. By comparing the performance data between two versions of the application, a vendor may identify performance anomalies. For example, regression testing is a type of testing that is used to verify that software that was previously working still performs correctly after the software is upgraded. New code, functionality, patches, or configuration changes introduced into an application may impact the performance of the application negatively. A software "bug" or error introduced into a new version of the application may also negatively impact the performance of the application. A performance regression refers to the decreased performance of an application from a first version to a second version.

In accordance with embodiments of this disclosure, a performance regression may be determined using performance testing of different versions of the software. One type of performance testing described herein is transaction response time at a plurality of resource levels. Although this disclosure describes the use of transaction response times, other types of tests could be used to measure performance of a version of an application. A transaction response time refers to the amount of time for the application to process a transaction. Users typically interact with computerized applications by making requests, known as transactions, which propagate through various system resources (e.g.: processor, memory, input/output processes, etc.). Once these requests are fulfilled, a response is sent back to the user. Transaction response times can be measured while one or more of the system resources are loaded. For example, by manipulating the loading level of a system resource (e.g., processor), a performance test can generate a set of transaction response times over a range of resource levels. The relationship between the transaction response times and the resource levels can be referred to as a transaction-resource model. Analysis of the transaction-resource models between different versions of an application can simplify the detection of performance regression with less overhead and time than might otherwise be used.

Figure 1:
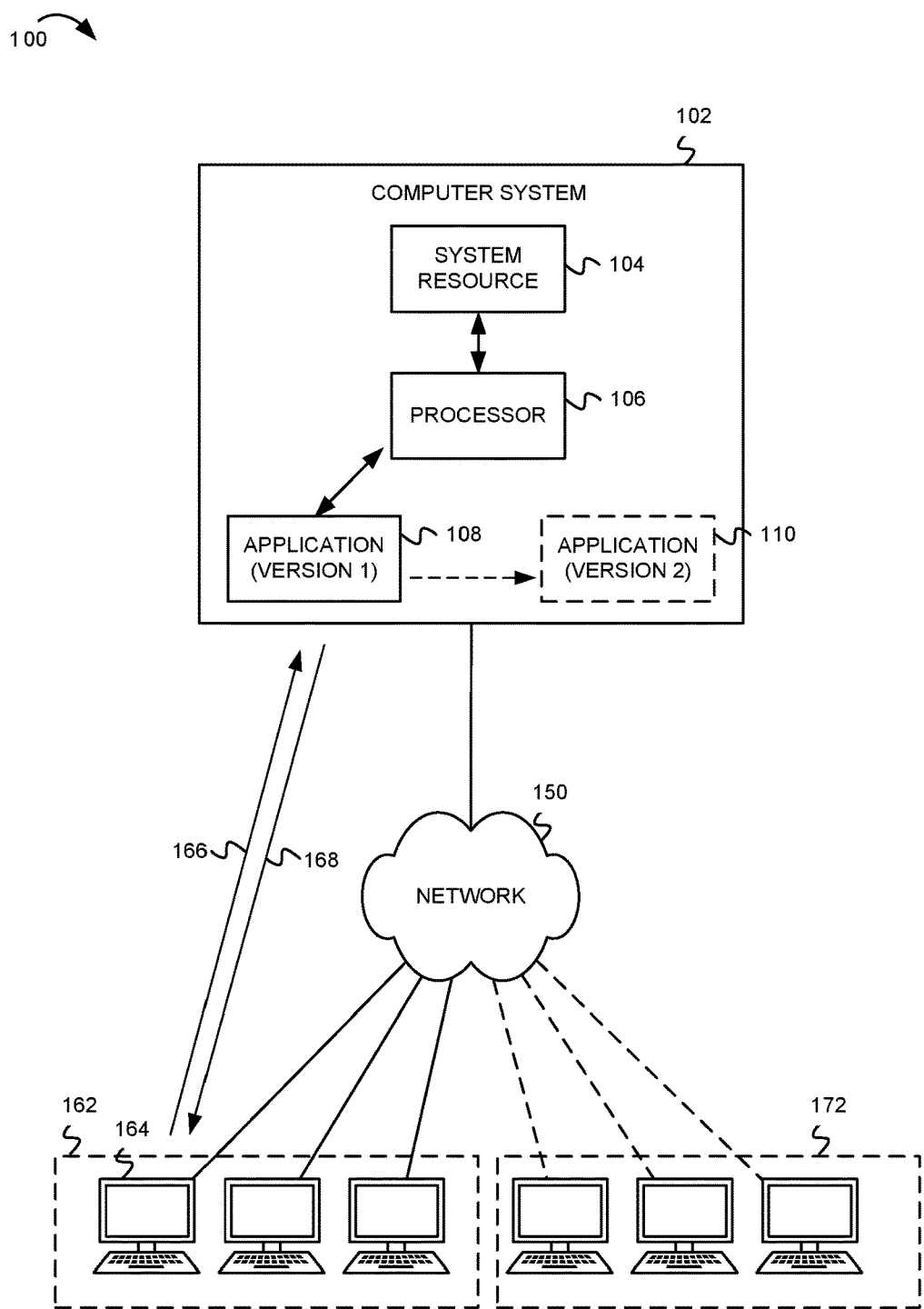
FIG. 1 is a block diagram illustrating an application server and clients to introduce concepts of this disclosure.

FIG. 1 is a block diagram 100 illustrating a traditional technique for testing an application in which performance regression may be more difficult or time-consuming to detect. In FIG. 1, a computer system 102 operates as a server in a network 150. A first set of client machines 162 are also coupled to the network 150. For example, the network 150, client machines 162, and computer system 102 may comprise an enterprise environment running a server-client application. The computer system 102 includes a processor 106 and a first version 108 of an application. The processor 106 is considered a system resource for the computer system 102. Other types of system resources may include memory, power, disk space, etc. A part of the memory may be configured to form a resource queue, a paging space, a database, etc., all of which are other examples of a system resource. In computer system 102, a system resource 104 is illustrated to generically represent any of the system resources that may be present in addition to the processor 106.

The first version 108 of the application may utilize the processor 106 and/or the system resource 104 to process a transaction. FIG. 1 illustrates a transaction between a first client machine 164 and the computer system 102. The transaction is depicted as a request (shown as arrow 166) and a response (shown as arrow 168). Although the arrows 166 and 168 are depicted separate from the network 150, it is understood that any number of communication tools, including network 150, may be present between the first client machine 164 and the computer system 102.

At a time when a second version 110 of the application is deployed, the second version 110 may be implemented at the same environment as the first version 108. For example, the enterprise may upgrade the application to a latest version. Alternatively, a beta testing environment may be used to test the new version. However, it may not be possible to accurately compare the performance of the two versions since the environment may have changed. For example, a second set of client machines 172 may have been added to the enterprise environment. The processor 106 and/or system resource 104 may be changed in a number of ways (such as an upgrade to the computer system 102, or a decrease in performance based on additional applications installed). Furthermore, the network 150 or other infrastructure may have changed, making an accurate comparison between the first version 108 and the second version 110 difficult to achieve. Therefore, it may be time consuming and/or less accurate to detect performance regression in an inconsistent environment, such as described in FIG. 1.

Figure 2:
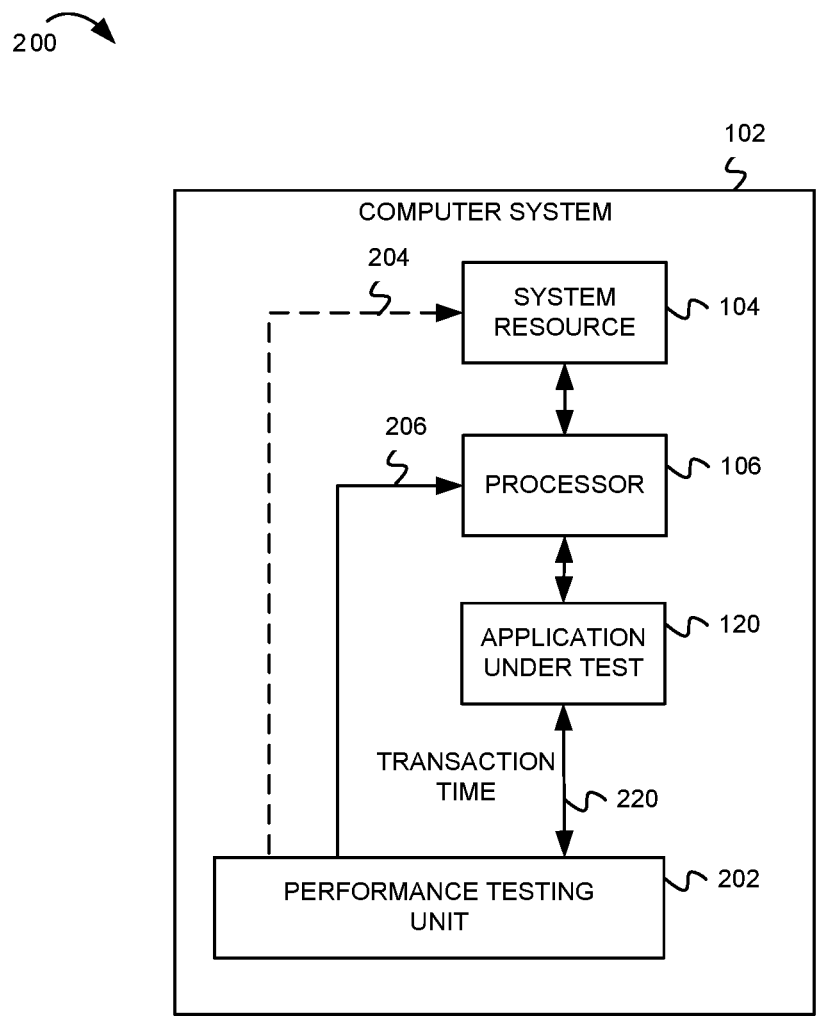
FIG. 2 is a block diagram illustrating a computer system for conducting performance testing in accordance with an embodiment of this disclosure.

FIG. 2 is a block diagram 200 illustrating a technique for performance testing in accordance with an embodiment of this disclosure. The technique can be used to model transaction response times at a plurality of resource levels of a computer system 102. The computer system 102 may include a processor 106 and system resource 104, as described in FIG. 1. However, the application can be tested in the computer system 102 by manipulating the resource levels during a test. In this disclosure, the performance testing will be described in terms of manipulating the processor (e.g. CPU) of the computer system 102. However, the concepts can be easily applied to other resources like memory, network resources, or even a combination of several resources.

In FIG. 2, the computer system 102 includes a performance testing unit 202 which has the capability of manipulating (shown as arrow 206) the loading of the processor 106. Additionally, or alternatively, the performance testing unit 202 can manipulate (arrow 204) the system resource 104. The performance testing unit 202 can measure the transaction response time 220 for a simulated transaction to the application 120 (or version thereof) being tested. For example, the performance testing unit 202 can simulate a transaction to the application 120 while the processor 106 is loaded at a first resource level and measure the transaction response time. Although depicted as running on the computer system 102, in some embodiments, the performance testing unit 202 can be running on a separate physical or virtual machine so that the performance testing unit 202 does not impact other resources of the computer system 102 beyond those which are intended to be manipulated for the performance testing.

Performance testing can be performed to obtain performance data. For example, the transaction response time, and the resource level, can be recorded as a data pair. The resource level may also be referred to as a resource utilization, and can be measured using the performance testing unit 202 or other system-monitoring tools. The transaction response time and resource level can be plotted as a point in a line graph, as shown in FIGS. 3-4.

Conveniently, the performance testing in FIG. 2 does not have the inconsistencies that may occur in a production environment. For example, the performance testing focuses on the transactions occurring at the server (e.g., computer system 102) without regard to delays at the client machines or network infrastructure. Instead, it can be assumed that a transaction response time for a first version of the application (on a server) at a certain resource level will be relatively consistent for the same transaction processed by a second version of the application at the same resources level. By testing transaction response time in relation to resource levels, the performance testing can disregard increased transaction response times that are a result of increased loads on the server and/or changes in the infrastructure. Instead, the transaction response times for different versions can be compared in relation to resource levels of the computer system 102.

Figure 3:
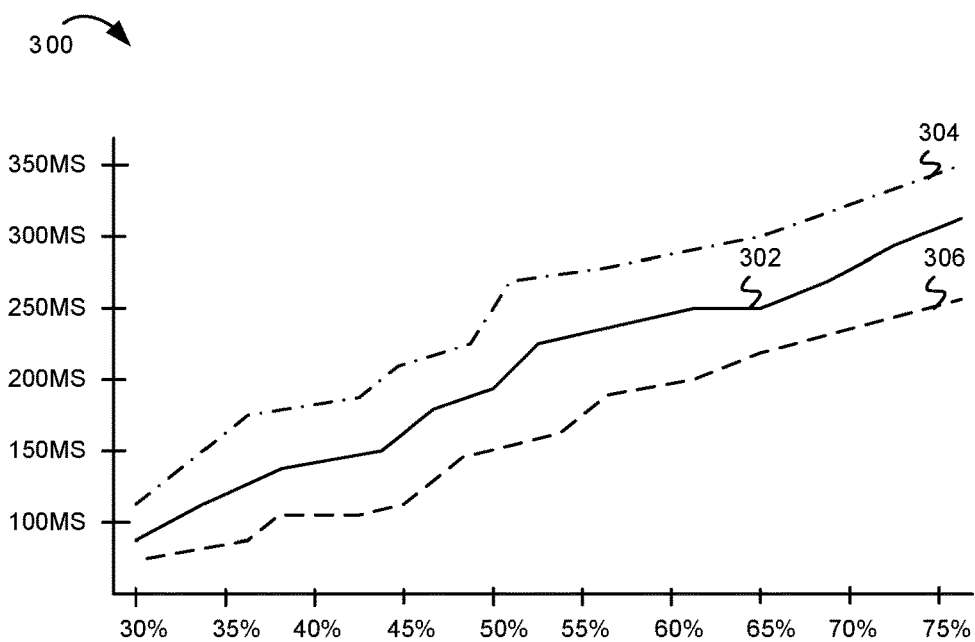
FIG. 3 is a chart illustrating line graphs for an average performance, an upper limit, and a lower limit associated with a first performance test in accordance with an embodiment of this disclosure.
Figure 4:
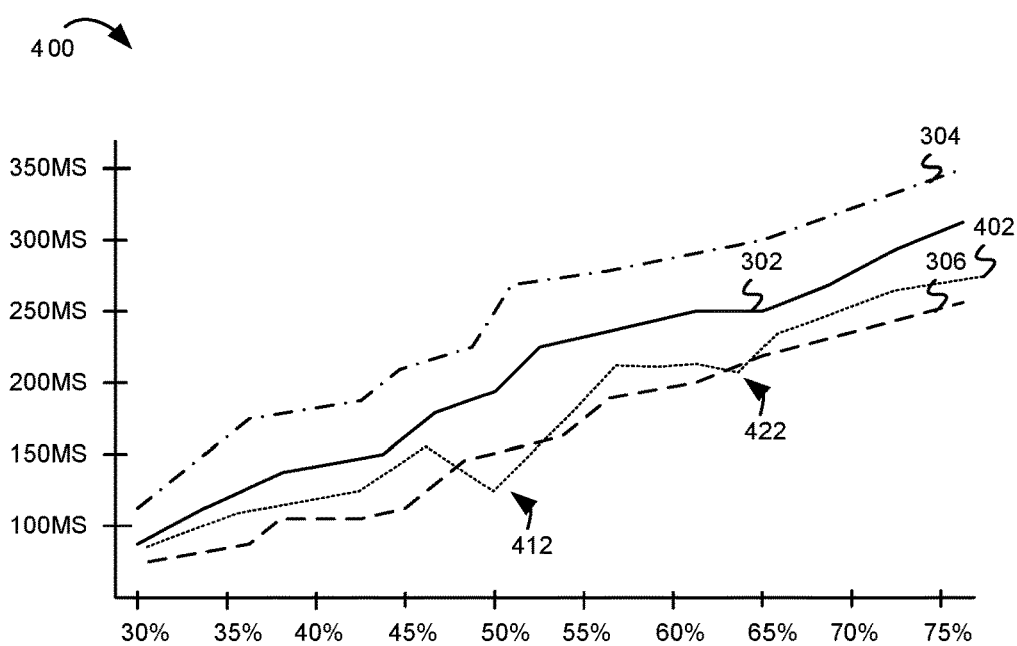
FIG. 4 is a chart illustrating the line graphs of FIG. 3 with a new line graph for a second performance test in accordance with an embodiment of this disclosure.

FIG. 3 is a chart 300 illustrating line graphs for an average performance, an upper limit, and a lower limit associated with a first performance test in accordance with an embodiment of this disclosure. Along the x-axis a plurality of resource levels is illustrated. For example, FIG. 3 shows a range from 30% utilization to 75% utilization of a processor. Along the y-axis, a range of transaction response times is illustrated. For example, the transaction response times range from 100 ms to 350 ms. It should be understood that the designation of x- and y-axis may be reversed, and any combination of performance testing measurement and resource level could be used.

The chart 300 shows a solid line representing a first line graph 302 using the first set of transaction response times for the first plurality of resource levels. In one embodiment, the performance testing may be conducted several times and averages for the transaction response times at each resource level can be plotted to generate the first line graph 302.

An upper limit line graph 304 (dashed-dotted line) and a lower limit line graph 306 (dashed line) can be determined from the first set of transaction response times. For example, the upper limit line graph 304 and lower limit line graph 306 may be based on a statistical calculation (e.g. standard deviation) from the first line graph 302. Alternatively, the upper limit line graph 304 and lower limit line graph 306 may represent maximum and minimum transaction response times measured for each resource level over a series of performance tests on the first version of the application.

Having determined the upper limit line graph 304 and lower limit line graph 306, it is now possible to compare the performance of a second version of the application. For example, if the upper and lower limit line graphs represent a performance tolerance (also referred to as an expected performance range) for the application, a performance regression change can be detected if the performance of the new version exceeds the limits of the performance tolerance.

FIG. 4 is a chart 400 illustrating the line graphs of FIG. 3 with a new line graph 402 (dotted line) for a second performance test associated with a second version of the application. During the second performance test, a second set of transaction response times are measured for the application at a second plurality of resource levels. It should be clear that the resource levels used for the first performance test and the second performance test may be different resource level within the same range of resource levels. In one embodiment, the test may be automated and may manipulate the resource levels to the same plurality of resource levels for both the first performance test and the second performance test.

In FIG. 4, there are two areas of anomalies (identified at 412 and 422) in which the new line graph 402 exceeds the performance tolerance defined by the upper and lower limit line graphs. There are two types of anomalies that this technique may identify. In one example type, the new line graph falls below the lower limit line graph. For example, the transaction response times for the second performance test (of the second version of the application) may be lower than the lower limit line graph. This is the type of anomaly shown at 412 and 422 in FIG. 4. Another type of anomaly occurs when the new line graph is greater than the upper limit line graph. For example, the transaction response times for the second performance test may be higher than the upper limit line graph. Both types of anomalies may represent a performance regression. For brevity, this disclosure describes the first type of anomaly in the following examples.

At the first anomaly 412, the new line graph 402 has fallen below the lower limit line graph 306. The system can determine an area between the new line graph 402 and the lower limit line graph 306. For example, the system may interpolate data points for each of the line graphs and calculate an area between the line graphs based on the interpolated data points. The first anomaly 412 may have a corresponding first area. Similarly, at the second anomaly 422, the new line graph 402 has fallen below the lower limit line graph 306. A second area may be calculated based on the area between the new line graph 402 and the lower limit line graph 306 at the second anomaly 422.

Either, or both, of the first and second anomalies 412, 422 may be caused by a performance regression. However, a minor deviation from the performance tolerance is less indicative than a major deviation from the performance tolerance. The calculated area associated with each anomaly can be compared against a threshold amount to determine whether to indicate a performance regression has been detected.

For example, the first anomaly 412 may have a corresponding first area that is greater than the threshold amount. For the first anomaly 412, a system may indicate that a performance regression has been detected (for that anomaly) in response to the first area being greater than a threshold amount. For the second anomaly 422, the system may determine that the second area is below the threshold amount and refrain from indicating the second anomaly 422 as a performance regression. Thus, the threshold amount can be used to limit false positives while still identifying anomalies that represent a performance regression.

The indication regarding the performance regression may include a weighted value (also referred to as an exception value, or confidence score). For example, weighted value may be based on the number of measurements used to calculate the average transaction response times in the first performance test. If multiple measurements are included in the calculation of the average transaction response times (and/or in the calculation of the upper and lower limit line graphs), the weighted value may be weighted on the quantity of measurements included.

Figure 5:
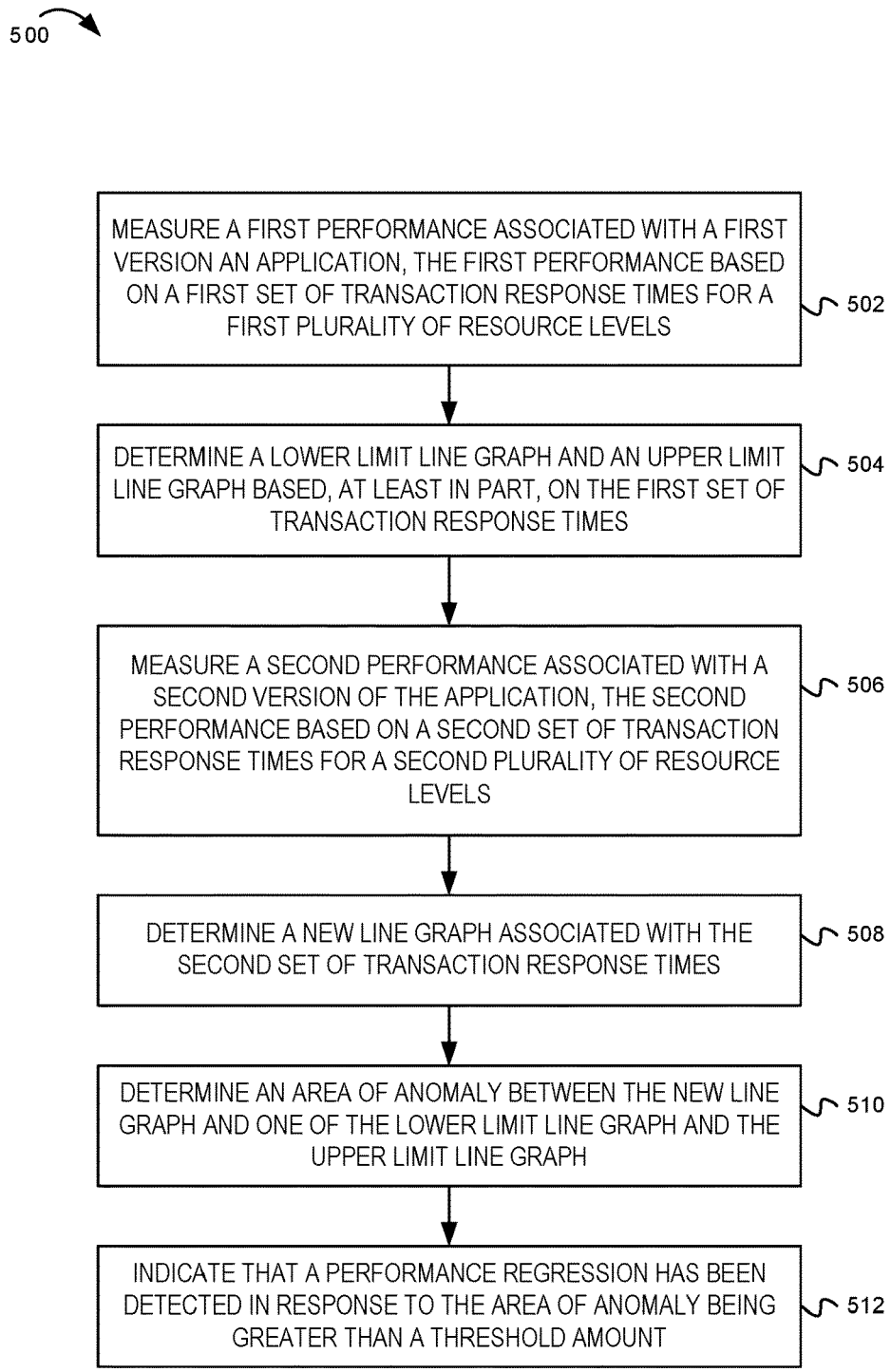
FIG. 5 is a flow chart illustrating example operations of detecting a performance regression in accordance with an embodiment of this disclosure.

FIG. 5 is a flow chart 500 illustrating example operations of detecting a performance regression in accordance with an embodiment of this disclosure.

Beginning at block 502, operations include measuring a first performance associated with a first version an application, the first performance based on a first set of transaction response times for a first plurality of resource levels. At block 504, the operations include determining a lower limit line graph and an upper limit line graph based, at least in part, on the first set of transaction response times. The lower limit line graph and upper limit line graph may represent a performance tolerance associated with a plurality of resource levels.

At block 506, the operations include measuring a second performance associated with a second version of the application, the second performance based on a second set of transaction response times for a second plurality of resource levels. At block 508, the operations include determining a new line graph associated with the second set of transaction response times.

At block 510, the operations include determining an area of anomaly. In one example, the area is between the new line graph and the lower limit line graph where the new line graph is less than the lower limit line graph. In another example, the area is between the new line graph and the upper limit line graph where the new line graph is greater than the upper limit line graph. The area can be calculated as a metric that indicates how much of a difference (area) is between two line graphs.

At block 512, the operations include indicating that a performance regression has been detected in response to the area of anomaly being greater than a threshold amount. The threshold amount can be a configurable value. Indicating that a performance regression has been detected may include sending a monitoring trap, sending a message, logging the performance regression, or any other type of indication to alert a user regarding the performance regression. The indication may be provided via an output of a computer system, such as a network interface, a display, or other output device. In some embodiments, the indication may be stored in a storage device of the computer system for later use via an output device.

The indication may include a weighted value to indicate a confidence that the detected anomaly is a performance regression. For example, the weighted value may be based on the amount of the area, the number of measurements in the average transaction response times, or the like.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 6:
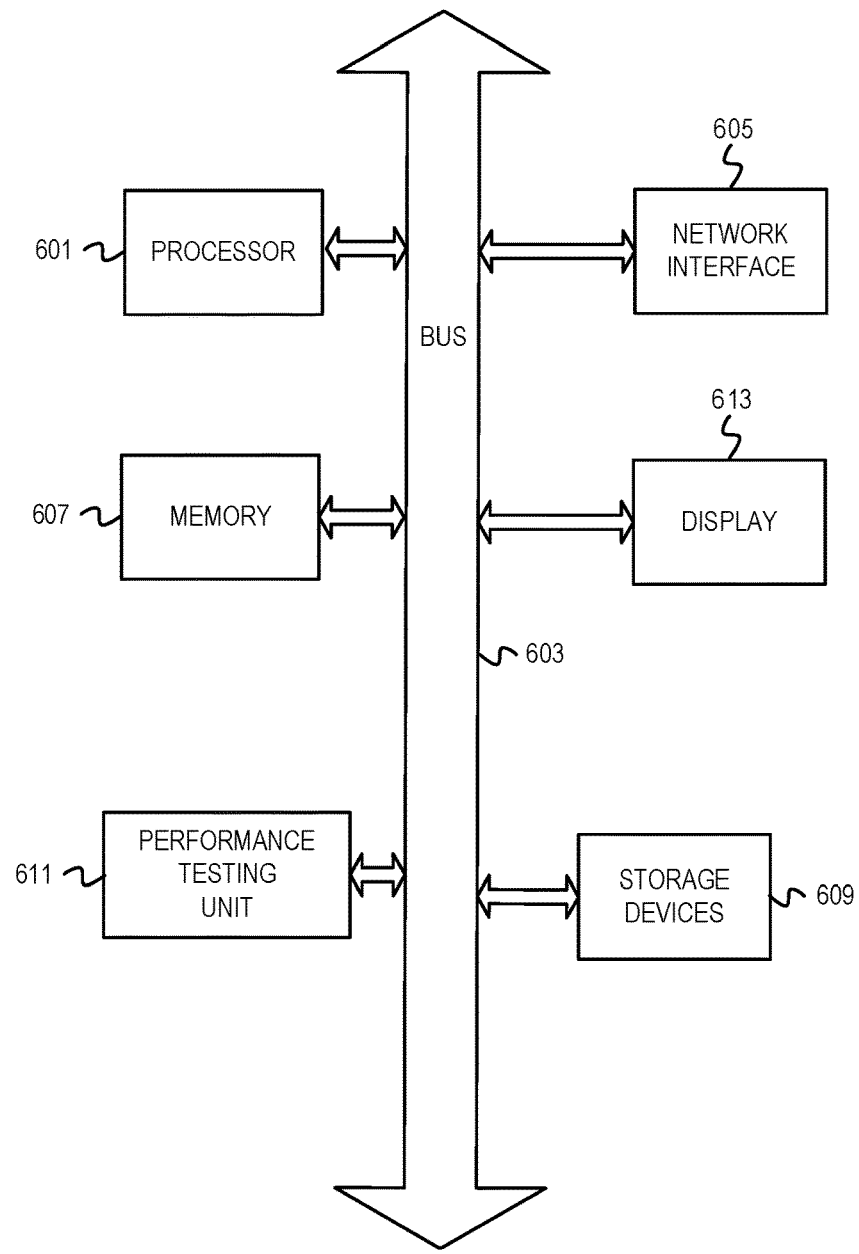
FIG. 6 depicts an example computer system in accordance with embodiments of this disclosure.

FIG. 6 depicts an example computer system 600. A computer system includes a processor 601 (possibly including multiple processors, multiple cores, multiple nodes, and/or implementing multi-threading, etc.). The computer system includes memory 607. The memory 607 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes a bus 603 (e.g., PCI, ISA, PCI-Express, HyperTransport®, InfiniBand®, NuBus, etc.), a network interface 605 (e.g., an ATM interface, an Ethernet interface, a Frame Relay interface, SONET interface, wireless interface, etc.), and a storage device(s) 609 (e.g., optical storage, magnetic storage, etc.). In some embodiments, the computer system may include a display 613. The display 613, the network interface 605, or any other output devices (not shown) may be referred to as an output device in this disclosure.

The system memory 607 embodies functionality to implement embodiments described above. For example, the system memory 607 may include instructions which, when executed by the processor 601, cause the computer system to perform any of the functionality described in FIGS. 1-5. Any one of these functionalities may be partially (or entirely) implemented in hardware and/or on the processor 601. For example, the functionality may be implemented with an application specific integrated circuit, in logic implemented in the processor 601, in a co-processor on a peripheral device or card, etc. Further, realizations may include fewer or additional components not illustrated in FIG. 6 (e.g., video cards, audio cards, additional network interfaces, peripheral devices, etc.). The processor 601, the storage device(s) 609, and the network interface 605 are coupled to the bus 603. Although illustrated as being coupled to the bus 603, the memory 607 may be coupled to the processor 601.

While the embodiments are described with reference to various implementations and exploitations, it will be understood that these embodiments are illustrative and that the scope of the inventive subject matter is not limited to them. In general, techniques for detecting a system's performance regression as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method performed by a computer system for detecting a performance regression between versions of an application, the method comprising:
    preparing a performance test in which a performance testing unit of the computer system is configured to manipulate at least one resource of the computer system over a plurality of resource levels while the application is executed;
    measuring, by the computer system, a first set of transaction response times corresponding to the plurality of resource levels while executing a first version of the application using at least one iteration of the performance test;
    determining, by the computer system, a lower limit line graph and an upper limit line graph based, at least in part, on the first set of transaction response times;
    measuring, by the computer system, a second set of transaction response times corresponding to the plurality of resource levels while executing a second version of the application using the performance test;
    determining, by the computer system, a new line graph associated with the second set of transaction response times;
    determining an area of anomaly, wherein the area comprises one of
        an area between the new line graph and the lower limit line graph where the new line graph is less than the lower limit line graph, and
        an area between the new line graph and the upper limit line graph where the new line graph is greater than the upper limit line graph; and
    indicating, via an output device of the computer system, that the performance regression has been detected in response to the area of anomaly being greater than a threshold amount.

2. The method of claim 1, wherein determining the lower limit line graph and the upper limit line graph comprises:
    for each resource level of the plurality of resource levels:
        determining an average transaction response time for the resource level; and
        determining a lower limit time and an upper limit time based, at least in part, on a statistical deviation from the average transaction response time.

3. The method of claim 1, wherein the plurality of resource levels comprises a range of different levels for a resource of the computer system.

4. The method of claim 3, wherein the resource comprises one member of a group consisting of a processor, a memory, a resource queue, and a paging space.

5. The method of claim 1, wherein the performance test comprises a standard regression test for testing different applications.

6. The method of claim 1, wherein measuring the first set of transaction response times:
    performing multiple iterations of the performance test with the first version of the application; and
    determining average transaction response times for each of the plurality of resource levels,
    wherein the lower limit line graph and the upper limit line graph are based on the average transaction response times.

7. The method of claim 6, further comprising:
    determining a weighted exception value based, at least in part, on a quantity of iterations that are used to determine the average transaction response times,
    wherein indicating that the performance regression has been detected comprises indicating the weighted exception value.

8. The method of claim 1, wherein the performance testing unit is implemented on a separate physical or virtual machine so that the performance testing unit does not impact other resources of the computer system beyond the at least one resource of the computer system which are manipulated for the performance test.

9. A computer system for detecting a performance regression between versions of an application, the computer system comprising:
    a processor; and
    memory having instructions stored therein which, when executed by the processor cause the computer system to:
        prepare a performance test in which a performance testing unit of the computer system is configured to manipulate at least one resource of the computer system over a plurality of resource levels while the application is executed;
        measure a first set of transaction response times corresponding to the plurality of resource levels while executing a first version of the application using at least one iteration of the performance test;

determine a lower limit line graph and an upper limit line graph based, at least in part, on the first set of transaction response times;

measure a second set of transaction response times corresponding to the plurality of resource levels while executing a second version of the application using the performance test;

determine a new line graph associated with the second set of transaction response times;

determine an area of anomaly based on the new line graph, wherein the area comprises one of
- an area between the new line graph and the lower limit line graph where the new line graph is less than the lower limit line graph, and
- an area between the new line graph and the upper limit line graph where the new line graph is greater than the upper limit line graph; and indicate, via an output device of the computer system, that the performance regression has been detected in response to the area of anomaly being greater than a threshold amount.

10. The computer system of claim 9, wherein the instructions which cause the computer system to determine the lower limit line graph and the upper limit line graph comprise instructions which, when executed by the processor, cause the computer system to:

for each resource level of the plurality of resource levels:
- determine an average transaction response time for the resource level; and
- determine a lower limit time and an upper limit time based, at least in part, on a statistical deviation from the average transaction response time.

11. The computer system of claim 9, wherein the plurality of resource levels comprises a range of different levels for a resource of the computer system.

12. The computer system of claim 11, wherein the resource comprises one member of a group consisting of the processor, the memory, a resource queue, and a paging space.

13. The computer system of claim 9, wherein the performance test comprises a standard regression test for testing different applications.

14. The computer system of claim 9, wherein the instructions which cause the computer system to measure the first set of transaction response times comprise instructions which, when executed by the processor, cause the computer system to:

perform multiple iterations of the performance test with the first version of the application; and determine average transaction response times for each of the plurality of resource levels, wherein the lower limit line graph and the upper limit line graph are based on the average transaction response times.

15. The computer system of claim 14, wherein the instructions, when executed by the processor, further cause the computer system to determine a weighted exception value based, at least in part, on a quantity of iterations that are used to determine the average transaction response times, and wherein the instructions that cause the computer system to indicate that the performance regression has been detected comprise instructions which, when executed by the processor, cause the computer system to indicate the weighted exception value.

16. A computer program product comprising a computer readable storage medium having instructions embodied therewith, the instructions executable by a processor of a computer system for detecting a performance regression between versions of an application, wherein the instructions cause the computer system to:

prepare a performance test in which a performance testing unit of the computer system is configured to manipulate at least one resource of the computer system over a plurality of resource levels while the application is executed;

measure a first set of transaction response times corresponding to the plurality of resource levels while executing a first version of the application using at least one iteration of the performance test;

determine a lower limit line graph and an upper limit line graph based, at least in part, on the first set of transaction response times;

measure a second set of transaction response times corresponding to the plurality of resource levels while executing a second version of the application using the performance test;

determine a new line graph associated with the second set of transaction response times;

determine an area of anomaly based on the new line graph, wherein the area comprises one of
- an area between the new line graph and the lower limit line graph where the new line graph is less than the lower limit line graph, and
- an area between the new line graph and the upper limit line graph where the new line graph is greater than the upper limit line graph; and indicate, via an output device of the computer system, that the performance regression has been detected in response to the area of anomaly being greater than a threshold amount.

17. The computer program product of claim 15, wherein the instructions which cause the computer system to determine the lower limit line graph and the upper limit line graph comprise instructions which, when executed by the processor, cause the computer system to:

for each resource level of the plurality of resource levels:
- determine an average transaction response time for the resource level; and
- determine a lower limit time and an upper limit time based, at least in part, on a statistical deviation from the average transaction response time.

18. The computer program product of claim 16, wherein the plurality of resource levels comprises a range of different levels for a resource of the computer system.

19. The computer program product of claim 18, wherein the resource comprises one member of a group consisting of the processor, a memory, a resource queue, and a paging space.

20. The computer program product of claim 16, wherein the performance test comprises a standard regression test for testing different applications.

* * * * *